Sept. 6, 1955 — A. C. MUNSTER — 2,717,358
ELECTRICAL SYSTEM
Filed Nov. 4, 1949 — 2 Sheets-Sheet 1
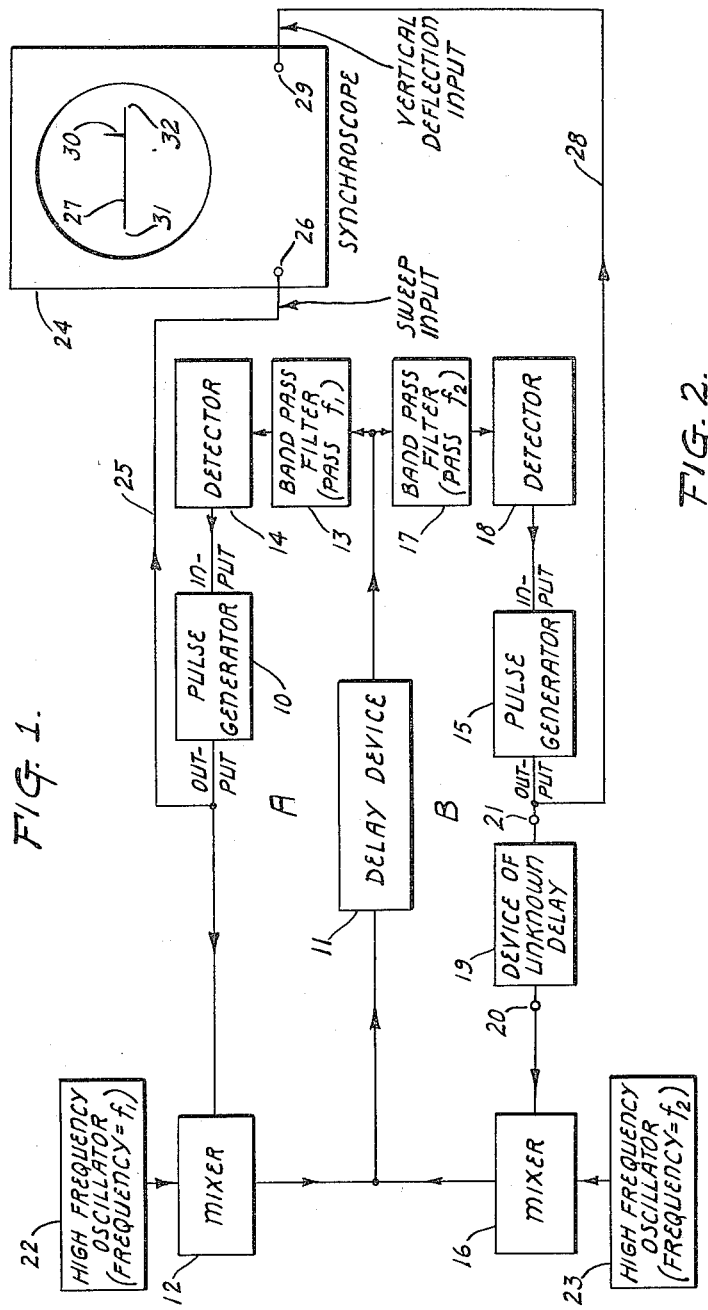
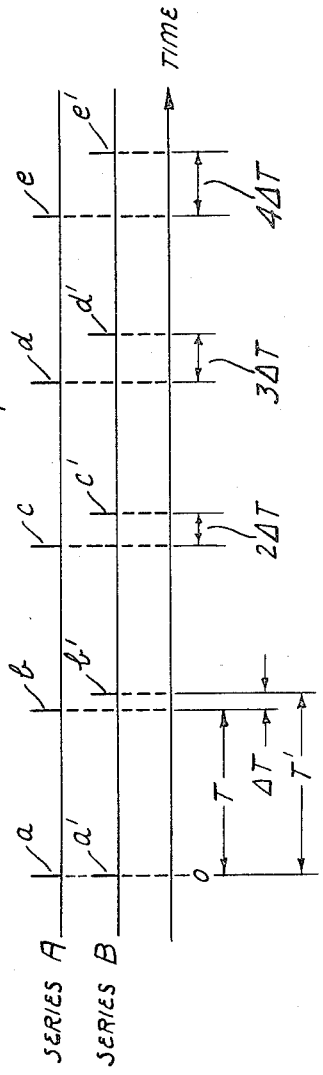
INVENTOR.
ALLEN C. MUNSTER
BY
AGENT

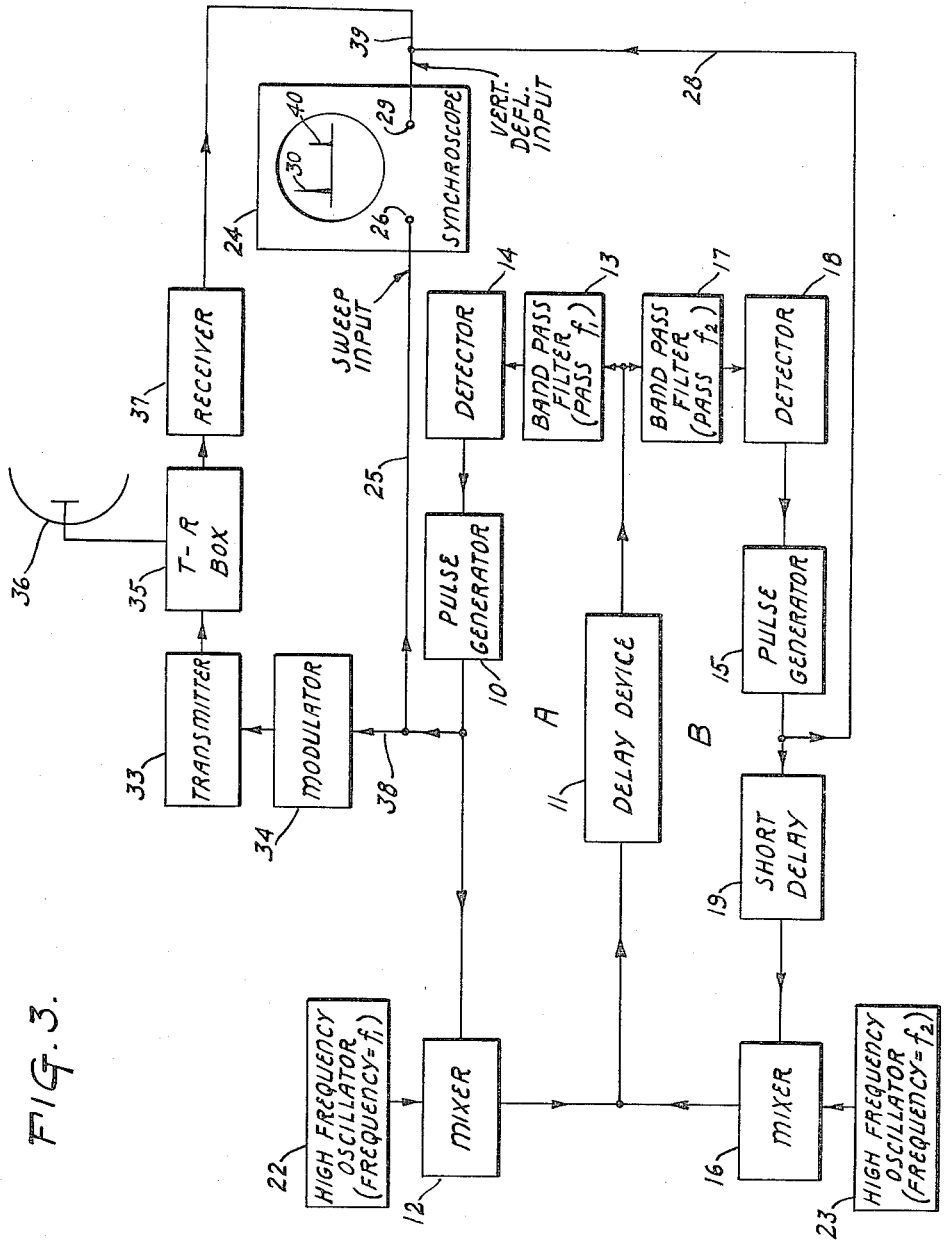

United States Patent Office 2,717,358
Patented Sept. 6, 1955

2,717,358

ELECTRICAL SYSTEM

Allen C. Munster, Hatboro, Pa., assignor to Philco Corporation, Philadelphia, Pa., a corporation of Pennsylvania Application November 4, 1949, Serial No. 125,623

10 Claims. (Cl. 324—68)

This invention relates to apparatus for the precise measurement of time intervals. More particularly, it relates to apparatus for the measurement of time intervals which are so short that conventional time measuring devices are incapable of measuring them with any reasonable degree of accuracy.

It is, for example, frequently desirable to measure the time which elapses between the application of an electrical signal to the input of an amplifier, filter, or other electical transducer and the appearance of a corresponding signal at the output of the same transducer. Measurement of this time interval yields important information regarding the delay distortion caused by the transducer. In many cases, this signal traversal time is extremely short, being often of the order of millimicroseconds. Conventional time measuring devices are quite incapable of indicating such extremely small time intervals with any reasonable degree of accuracy.

Also it is frequently desired to measure the time elapsed between the occurrence of two consecuptive pulses. In a radar system, for example, it is common practice to measure the time interval between the transmission of a pulse of electro-magnetic wave energy and the reception of an object-reflected portion of this same pulse. Since the velocity of propagation of the transmitted and reflected signals is known and equal, determination of the aforesaid time interval between transmission and reception is tantamount to determination of the range of the reflecting object. The precision with which the range of objects is determined by a radar system is thus dependent upon the precision with which the time interval separating the occurrence of two pulses is measured. In the case of most practical radar systems, the time intervals involved are of the order of microseconds. Although devices are known to the art which are capable of giving indications of such time intervals, their precision leaves much to be desired. They are, in fact, generally incapable of measuring these intervals with the extremely high degree of precision which may be required in certain instances—as, for example, where the data is to be used for fire control.

Summarizing, there are no prior art devices capable of measuring the extremely short traversal times of signals through electrical transducers, even with a low degree of precision. Nor are there prior art devices adapted for the precise measurement of relatively longer time intervals between successively occurring pulse signals.

It is, accordingly, a principal object of this invention to provide apparatus for the precise measurement of time intervals.

It is another object of the invention to provide apparatus for measuring time intervals which are so extremely short that heretofore it has been practically impossible to measure them with any satisfactory degree of precision.

It is still another object of the invention to provide apparatus for measuring the time interval which elapses between the application of a signal to the input of an electrical transducer and the appearance of the signal at the output of the transducer.

A still further object of the invention resides in the provision of apparatus for the measurement of the time interval between the occurrence of two consecutive pulses with a degree of precision hitherto unattainable.

It is well recognized that long time intervals are susceptible of measurement with much greater precision than are short time intervals. Relying on this fundamental principle, the present invention provides a method of and means for effecting measurement of the durations of relatively short intervals without the direct measurement of such durations, but rather through the measurement of the durations of intervals which are many times longer, whereby the inherent precision of measurement is greatly enhanced.

According to one aspect of the invention, where a very short time interval is to be measured, there is first generated a series of pulse signals which are periodically recurrent with a period many times longer than the duration of the interval to be measured. Also there is generated a second and distinct series of pulse signals which are periodically recurrent with a period equal to the sum of the period of recurrence of the pulse signals in the first series plus the duration of the short interval to be measured. Then, at some arbitrary time, the relative time-spacing between a pulse in the first series and the most nearly contemporaneous pulse in the second series is observed. Later, after the passage of a period of time sufficient to permit the occurrence of a plurality of subsequent pulses in both series, the spacing between the nth pulse in the first series and the corresponding pulse in the second series is observed. From these two observations, the change in spacing between corresponding pulses in the two series during the intervening interval may be ascertained. As will be more readily apparent from the detailed discussion to follow, since the second observation of spacing between pulses in the two series is made after the occurrence of an arbitrary number, $n$, of pulses in each of the series, the change in spacing, as determined from the two observations, will be exactly equal to $n-1$ times the duration of the short interval which was to be measured. By simply dividing the value of this observed change in spacing by the integer $n-1$, there is obtained a highly precise value of the duration of the interval which was to be measured.

In practice, the first observation, above referred to, may be made at a time when pulses in the two series occur exactly simultaneously. Under such circumstances, the first observation of spacing can obviously be made with a high degree of accuracy. The second observation is made at a time when the spacing between corresponding pulses in the two series is relatively large compared to the duration of the interval to be measured. Hence it likewise is susceptible of measurement with considerable precision. Since the ultimate measurement of the original interval is dependent solely upon these two observations, and since they are both made with a high degree of precision, the measured value will likewise be highly precise.

According to another of its aspects, the invention may also conveniently be used to effect very precise measurement of the durations of intervals of relatively longer duration. According to this aspect, the method employed is very similar to that above set forth for the measurement of the durations of very short intervals. In this instance, as in the one discussed above, there are first generated a series of pulses which are periodically recurrent with a relatively long period. For example, the period of recurrence of these pulses may be of the order of the duration of the interval to be measured and may even be of greater duration than said interval. A second and distinct series of pulses is also generated, which are periodically recurrent with a period slightly greater than the period of the pulses in the first series, the difference between the periods in the two series being precisely ascertained. At some arbitrary time, corresponding to the beginning of the interval whose duration is to be measured, the spacing between pulses in the first and second series is observed. Then a time is permitted to elapse until the spacing between corresponding pulses in the two series becomes exactly equal to, or most closely approximates, the duration of the interval to be measured. The number of pulses occurring in either of the two series before this condition obtains is noted. The value of the duration of the interval to be measured may then be arrived at simply by multiplying the known difference between the periods of occurrence of pulses in the two series by the number of pulses which occur in either series during the interval above referred to. As in the instance first discussed, the first observation of spacing between pulses in the two series may be made at a time when pulses occur simultaneously in both series. This will facilitate the making of the second observation, which will then be made at a time when the actual spacing between pulses in the first and second series is equal to the duration of the interval to be measured. In counting the number of pulses which occur during the interval, only one of the two which occur at the beginning and the end of the interval respectively should be counted.

In practicing the invention as above outlined, the generator of each series of periodically recurrent time-spaced pulse signals may conveniently comprise a conventional pulse generator, such as a multivibrator or blocking tube oscillator, which is adapted to be triggered in response to a pulse applied to its input to initiate the generation of a similar pulse in its output circuit. The output of this pulse generator is fed back to its input through a delay line or other suitable delay device to effect triggering of the pulse generator a predetermined time after the production o fa pulse in its output circuit, such time being determined by the delay line included in the connection between its output and its input. Thus the pulse generator is caused to generate time-spaced pulse signals periodically recurrent with a period substantially equal to the delay introduced by the delay line. In the preferred embodiment of the invention a single delay device is made common to the connection between the outputs and inputs of both pulse generators and, in the connection between the output and the input of one of the pulse generators, an additional delay device is included whose delay is relatively short compared to that of the common delay device. Thus the pulse generator, whose output to input connection includes both delay devices, is caused to generate pulses with a period somewhat greater than that of the other pulse generator, whose output to input connection includes only the single common delay device.

It will be understood that, instead of a common delay device, two separate delay devices may be used, a different one of these being connected between the output and the input of each generator, provided only that these two delay devices have substantially identical delay characteristics.

In practicing the invention, measurement of the relative spacing between pulses generated by one of the pulse generators and those generated by the other pulse generator can be readily effected through the use of a conventional cathode ray tube synchroscope. To this end, the pulses produced by one of these generators may be applied to initiate the time base sweep of the synchroscope, while the pulses produced by the other generator may be applied to produce deflection of the electron beam of the synchroscope in a direction transverse to the time base sweep. In such an arrangement variations in the relative spacing between pulses in the two series are evidenced by changes in the positions at which deflections of the electron beam are produced in the direction transverse to the time base.

It will be apparent that, in accordance with the first aspect of the invention as discussed above, the relatively short delay device, which is included in the output to input connection of but one of the pulse generators, may be a device or circuit element whose delay is to be measured. In this instance, only the delay of the device which is common to the output to input connection of both pulse generators need be ascertained in advance to permit determination of the delay inherent in the other delay device. In making such a determination, the spacing between the pulses in the two series is ascertained by observation of the relative positions of such pulses on the screen of the synchroscope, the length or duration of whose time base is known.

On the other hand, in practicing the invention in its second aspect as above discussed, it is necessary that the delays of both of the delay devices associated with the two pulse generators be known. In this instance, the synchroscope serves merely as a means for comparing and matching the time interval between pulses in the two series with an unknown time interval whose duration is to be measured. In effecting such a comparison, pulses indicative of the beginning and end of the interval whose duration is to be measured may be applied to the synchroscope to produce deflections transverse to its time base in addition to those which are produced by the pulses which are thus applied from the two pulse generators.

The invention will be more fully understood from a consideration of the following detailed discussion of certain of its representative embodiments, and of the drawings illustrating said embodiments, in which:

Fig. 1 is a block diagram illustrative of an embodiment of the invention in accordance with the first aspect thereof as above discussed and which is particularly adapted for use in the measurement of the relatively short delays inherent in certain physical circuit elements;

Fig. 2 is a diagram to which reference will be made in explaining the operation of embodiments of the invention; and Fig. 3 is a block diagram of another embodiment of the invention, in accordance with its second aspect as above discussed, and which is particularly adapted for use in the measurement of the time-spacing between successively occurring pulse signals. Its application for this purpose is shown in connection with a conventional radar system.

Referring now to Fig. 1, a pulse generator 10 and a delay device 11 are serially connected in a closed circuit A together with mixer 12, band-pass filter 13 and detector 14. Delay device 11 is also connected serially with pulse generator 15 in a second closed circuit B together with mixer 16, band-pass filter 17 and detector 18. The latter circuit is completed through a devise 19 of unknown delay which is connected in the circuit between terminals 20 and 21. The latter may be any device or circuit element, the delay of which is unknown and which it is desired to ascertain. Pulse generators 10 and 15 may be conventional multivibrators, blocking oscillators, or other similar circuits responsive to pulses applied to their inputs to initiate the generation of corresponding pulses in their output circuits. Delay device 11 may be any one of the many conventional delay devices known to the prior art; for example, in one embodiment according to the invention, it consisted of a supersonic mercury delay line comprising a confined column of mercury with suitable signal transducers disposed at its two ends.

In the closed loop or circuit A, the pulse generator 10 and delay device 11 cooperate to generate, in the loop circuit, a series of time-spaced pulse signals periodically recurrent with a period substantialy equal to the delay to which signals are subjected in traversing delay device 11. This occurs by reason of the fact that every pulse appearing in the output of pulse generator 10 traverses delay device 11 and is then applied to the input of pulse generator 10 to trigger it and initiate the generation of a pulse in its output circuit which is delayed, with reference to the preceding pulse which appeared in its output circuit, by an amount equal to the delay inherent in delay device 11.

Similarly, in the closed loop or circuit B, pulse generator 15 cooperates with delay device 11 and the device 19 of unknown delay to generate in loop B a second series of time-spaced pulse signals periodically recurrent with a period substantially equal to the total delay to which signals are subjected in the traversal of both devices 11 and 19. Thus, pulses appearing in the output of pulse generator 15 traverse first device 19 of unknown delay and then device 11, following which they are applied to the input of pulse generator 15 to trigger it and initiate the production in its output circuit of another pulse whose delay with reference to the preceding pulse is substantially equal to the sum of the delays of devices 11 and 19.

In the arrangement as thus far described with reference to Fig. 1, the delay device 11 is common to both circuits A and B. Hence it is traversed by pulses from the outputs of both pulse generators 10 and 15. It is essential, of course, that only delayed pulses from the output of pulse generator 10 shall be supplied to its input to trigger it, and that only pulses from the output of pulse generator 15 be supplied to its input to trigger it. Since pulses from the outputs of both generators 10 and 15 appear in the output of delay device 11, some means must be provided for separating them, for supplying them to the inputs of their respective generators, and for preventing pulses from the output of one of the generators from being supplied to the input of the other generator. This is accomplished, in the embodiment according to Fig. 1, by modulating the outputs of pulse generators 10 and 15 on carrier waves of different frequencies before they are supplied to the input of delay device 11. To this end a mixer 12 and a source 22 of oscillations of frequency $f_1$ are employed to produce a carrier of frequency $f_1$ modulated by the pulse output from pulse generator 10. Similarly a mixer 16 and a source 23 of oscillations of frequency $f_2$ are employed to produce a carrier of frequency $f_2$ modulated by the pulses from the output of pulse generator 15, which are supplied to mixer 16 through the device 19 of unknown delay. The carrier waves of frequency $f_1$ and $f_2$, modulated respectively by the pulses from generators 10 and 15, appear in the output of delay device 11 and are separated through the action of band-pass filters 13 and 17, are then separately detected by detectors 14 and 18 respectively, and the resultant pulse signals are supplied respectively to the inputs of pulse generators 10 and 15. It will be appreciated, of course, that other expedients might be resorted to to prevent inter-action between the pulse generating circuits A and B. Thus, for example, the same results might be achieved by employing pulse amplitude or pulse width discriminatory means.

It will be understood that, in the embodiment illustrated, each of the circuit elements in loops A and B may have its own inherent delay characteristic. Thus, in practice, the delay which each pulse undergoes will not be determined exclusively by the common delay device 11 either singly, or in combination with the device of unknown delay. Rather, this delay will be increased by the sum of the delays due to all of the circuit elements such as the mixer, filter and detector through which each pulse passes in traversing one of the loops. Although the total delay increase due to these various circuit elements may be small compared to the delay of device 11, it is nevertheless important to avoid or to compensate for any discrepancies therein as between the two loops. This may be done by employing corresponding elements which are identical in both loops or by including an additional compensating delay of suitable magnitude in one of the two loops.

For convenience in further explaining the embodiment of the invention according to Fig. 1, reference is made to the diagram of Fig. 2. This diagram illustrates, with reference to a common time axis, the separate series of pulses produced respectively in circuits A and B. The pulses in series A are recurrent with a period T which, as hereinbefore mentioned, is substantially equal to the delay to which signals are subjected in traversing delay device 11. Those in series B are recurrent with a period T', slightly greater than period T, which is substantially equal to the total delay to which signals are subjected in the traversal of both delay devices 11 and 19. It is noted that, by reason of this difference between the periods of recurrence of pulses in the two series, the spacing of pulses in one series relative to corresponding pulses in the other series varies as a function of time. Thus, under certain circumstances, a pulse $a$ in series A may occur simultaneously with a pulse $a'$ in series B. Then the next subsequent pulse $b$ in series A will precede the next subsequent pulse $b'$ in series B by an amount $\Delta T$ equal to the difference between the periods of recurrence of T and T' of the pulses in the respective series. Similarly each subsequent pulse in series A will precede the corresponding subsequent pulse in series B by a time interval which is an integral multiple of $\Delta T$. Stated in general terms, the nth pulse in series A will precede the nth pulse in series B by a time interval $\tau$ equal to $(n-1)\Delta T$. As hereinbefore mentioned the time interval $\Delta T$ is equal to the unknown delay of device 13, which is to be ascertained by measurement. By measuring the spacing $\tau$ between the nth pulses in the two series and dividing the resultant value by $n-1$, the value of $\Delta T$ can be determined, as hereinbefore mentioned, with a degree of precision which is directly dependent upon the magnitude of $n$.

The means employed, in the embodiment of Fig. 1, to effect this measurement of the spacing, between a pulse in series A and the corresponding pulse in series B, comprises a conventional synchroscope 24. This device, which is well known in the art, comprises essentially a cathode ray tube together with means responsive to signals applied from an external source for initiating deflections of the cathode ray beam along a time base axis, and other means responsive to externally applied signals for deflecting the beam in a direction transverse to the time base axis to produce, on the screen of the cathode ray tube, indications, sometimes referred to as pips, which are displaced along the time base axis proportionally to the amount by which the signals which produce them are delayed with reference to the signals which initiate the time base sweep. For a more detailed description of the synchroscope, reference may be had, for example, to Technique of Microwave Measurements, volume XI of the M. I. T. Radiation Laboratory Series, edited by Carol J. Montgomery, McGraw-Hill Book Co., 1947, page 457.

In the embodiment of Fig. 1, the periodically recurrent pulses generated in the closed circuit A are applied through connection 25 to the sweep input terminal 26 of synchroscope 24. These pulses serve to initiate successive sweeps of the cathode ray beam along a horizontal axis to produce the horizontal trace 27 on the screen of the synchroscope. The time required for the beam to traverse the trace 27 may have any value less than the period of recurrence T of the pulses from circuit A applied to the sweep input terminal 26. Preferably, however, it is at least equal to a large fraction of this period. Periodically recurrent pulses generated in closed circuit B are supplied through connection 28 to the vertical deflection input terminal 29 of the synchroscope 24. During each successive sweep of the cathode ray beam of the synchroscope along the horizontal axis, one of these pulses from circuit B will produce a momentary vertical deflection of the cathode ray beam so as to produce, at some point along the trace 27, a single pip 30. As will be apparent from consideration of the diagram of Fig. 2, the horizontal displacement of this pip from the left-hand end 31 of the horizontal trace 27 will depend upon the number of pulses which have occurred in either of the two series following the occurrence simultaneously or substantially simultaneously of pulses in both series. The over-all effect of this, as visually represented on the screen of the synchroscope, is that the pip 30 will appear first at the left-hand end 31 of the trace 27 at a time when pulses occur simultaneously in both of the two series, and, during successive sweeps, will, appear at points progressively displaced by increasingly larger amounts to the right of point 31 along the horizontal trace 27. Ultimately the pip 30 will appear at the right-hand end 32 of the sweep 27. When this condition obtains, the time-spacing $\tau$ between the pulse in series A, which initiated the sweep during which this condition obtains, and the pulse from series B, which produced the pip 30 at the extreme right-hand end of trace 27, will be exactly equal to the time required for the beam of the cathode ray tube synchroscope to traverse the trace 27 from its left-hand end 31 to its right-hand end 32, which is known. The number of pips which occur during the time interval $t$ between the time at which a pip appears at the left-hand end of trace 27 and the time at which a pip occurs at the extreme right-hand end 32 of trace 27 may also be counted. Then, by dividing this time interval by the number of pulses which occur during it, as hereinbefore indicated, a measurement of the difference between the periods of recurrence of pulses in series A and in series B is obtained. As hereinbefore pointed out, this value is equal, in the case of the embodiment of Fig. 1, to the unknown delay of device 19.

The number of pips which occur along the trace of the synchroscope, between the time at which one occurs at the left-hand end 31 and the time at which one occurs at the right-hand end 32, may be considerable, and the operation of counting these pips by visual observation may therefore become exceedingly tedious. In fact, it is readily possible that an observer will lose count of the number of pips or will miscount them. This, therefore, represents a possible source of error in the making of the measurement, which it would be highly desirable to eliminate. Alternatively the pips may recur at such a high rate that it will be practically impossible to count them visually. Both of these difficulties may be overcome. This can be done in the following manner. Instead of actually counting the number of pips which occur during the interval in question, the time which elapses, between the occurrence of a pip at the left-hand end of the trace and the subsequent occurrence of a pip at the right-hand end, may be measured by a stop-watch or other suitable timer. The frequency of initiation $r$ of the sweeps of the synchroscope is known because the period of recurrence of the pulses in series A is known. From this information, the number of pulses which occur during the interval can be arrived at simply by multiplying the measured time by this frequency of recurrence. It is apparent that the duration $\Delta T$, of the interval whose duration is to be measured, is given by the following expression:

$$\Delta T = \frac{\tau}{rt-1} \quad (1)$$

By way of illustration of the application of the embodiment of the invention according to Figure 1, the following example of its use may be noted. It was desired to measure the delay to which signals would be subjected in traversing a short section of transmission line. The transmission line section was connected between terminals 20 and 21 in an arrangement according to Fig. 1, and the delay of device 11 was chosen such as to cause pulses to be generated in the closed circuit B at a repetition rate which provided a frequency spectrum lying principally within the range of the spectrum of the signals for the transmission of which the line section was to be used. It was determined that this value of delay was such as to cause pulses to be generated in the closed circuit A at the rate $r$ of 800 per second. The sweep length $\tau$ of the synchroscope was found to be 8 microseconds. The time $t$ which elapsed between the occurrence of a pip at the left-hand end of the synchroscope trace and the occurrence of a subsequent pip at the right-hand end of the trace was 30 seconds. Substituting these values in the expression given above for $\Delta T$, the delay inherent in the transmission line section was found to be 0.33 millimicrosecond. Since the shortest interval required to be measured in order to arrive at this value is more than a thousand times the value to be measured, it is apparent that the precision of the ultimate measurement is correspondingly enhanced.

It will be noted incidentally that, in making the measurement in the manner above described, the spacing between pulses in the two series is observed at a time when such spacing is equal to the total length of the synchroscope sweep. Obviously it is desirable to do this in order to achieve the maximum precision of measurement. However, in indicating that this is the most desirable procedure, it is not intended to preclude the possibility of measuring the spacing between pulses in the two series at a time when such spacing is less than the total length of the synchroscope sweep, which is also within the contemplation of the invention. In fact, it may be highly desirable and expedient, to do this under certain circumstances, as, for example, where apparatus according to the invention is utilized, in a radar system for example, to measure the time-spacing between successively occurring pulse signals. The application of the invention in this manner will now be considered with reference to the embodiment disclosed in Fig. 3.

In this figure there are shown, in block form, the essential components of an elementary radar system. These comprise a transmitter 33 and a modulator 34 for pulsing the transmitter to cause it to generate time-spaced pulse signals of high frequency energy which are supplied through TR box 35 to an antenna 36 by which they are radiated. Reflections of the transmitted pulses from target objects are also intercepted by the antenna 36 and are supplied through TR box 35 to the receiver 37. Associated with this radar system, in a manner which will now be indicated, is an arrangement in accordance with the invention which is exactly identical to the one just described with reference to Fig. 1. The several components of this arrangement are designated by the same reference characters which were used to designate the corresponding elements in Fig. 1, and the identity of the two arrangements will be apparent. Therefore it is considered unnecessary again to describe the organization and mode of operation of this arrangement in detail.

In the system according to Fig. 3, as in the one according to Fig. 1, pulses generated in the closed circuit A are supplied through connection 25 to the sweep input terminal 26 of synchroscope 24 and serve to initiate successive deflections of the cathode ray beam along the horizontal time base axis. Similarly pulses generated in closed circuit B are supplied through connection 28 to the vertical deflection input terminal of the synchroscope to cause a vertical pip 30 to appear on the synchroscope screen during the course of each deflection of the beam along the horizontal axis. As described with reference to Fig. 1, these pips will, during successive sweeps, be displaced by progressively larger amounts from the left-hand end of the horizontal trace on the synchroscope screen. In the arrangement of Fig. 3, however, there is also produced, on the screen of synchroscope 24, a pip 40 corresponding to the time of arrival at receiver 37 of a reflection of a transmitted pulse from a target object, whereby it is made possible readily to compare the interval between the transmission of a pulse by the radar system and the arrival of a reflection from a target object with the interval between corresponding pulses in the two series generated in closed circuits A and B respectively. To accomplish this, pulses generated in the closed circuit A are supplied through connection 38 to control the operation of modulator 34, whereby it is caused to produce modulating pulses corresponding to the pulses in series A, which, in turn, control transmitter 33 so as to cause it to transmit pulses of high frequency energy substantially contemporaneously with the pulses in series A. Thus the transmission of a pulse of high frequency energy by the radar system will coincide with the initiation of a horizontal sweep of the synchroscope 24. Furthermore, reflections of transmitted pulses from target objects arriving at receiver 37 are supplied through connection 39 to the vertical deflection input terminal of synchroscope 24 to cause an additional pip 40 to appear on the screen of the synchroscope during each horizontal sweep. It will be apparent that this pip will be displaced from the left-hand end of the synchroscope sweep trace by an amount proportional to the time which has elapsed between the transmission of the radar pulse and the arrival of its reflection from a particular target object. As will now be explained, this interval is susceptible of measurement in a manner which, while it differs slightly from that described with reference to the embodiment of Fig. 1, involves exactly the same fundamental principles as those which have already been discussed with reference to that embodiment.

Whereas, in the procedure described with reference to the embodiment of Fig. 1, the delay of device 11 and the length of the synchroscope sweep trace were ascertained in advance and were utilized in determining the delay of device 19, in the present instance the delays of both devices 11 and 19 must be ascertained in advance and are utilized to determine the duration of the interval between the transmission of a radar pulse and the arrival of its reflection from a target object. It will be observed that expression (1), hereinbefore given, may be rewritten as follows:

$$\tau = (rt-1)\Delta T \qquad (2)$$

In this expression, as hereinbefore pointed out, $\tau$ need not necessarily be taken as the entire length of the synchroscope sweep, but rather may be regarded as designating only a fraction of such sweep. For example, it may be regarded as designating the interval between the inception of the sweep at the left-hand end of the trace and the point at which a pip is produced in response to a reflection received by the radar system antenna. As hereinbefore noted, the value of $r$ is determined by the delay of delay device 11, which is known. Similarly the value of $\Delta T$ is equal to the delay of delay device 19. The time $t$ is equal to the time which elapses between the occurrence of the pip 30 produced by a pulse from series B at the extreme left-hand end of the synchroscope sweep trace and the occurrence of such a pip coincidentally with the pip 40 produced in response to the radar reflection. This latter time can readily be measured by means of a stop-watch or other suitable timer, as hereinbefore described with reference to Fig. 1. These values may then be substituted in expression (2) above to yield the value $\tau$ of the time interval between the transmission of a pulse by the radar system and the reception of the reflection thereof from a target object. It will of course be appreciated that, in the system according to Fig. 3, the relatively short delay of delay device 19 may initially be determined by following the procedure described with reference to Fig. 1.

In the foregoing description of two typical embodiments of the invention, the cathode ray tube synchroscope has been indicated as a suitable means for observing the time-spacing between pulse signals in two series having different periods of recurrence. It will be appreciated that other means might be employed for this purpose and that the invention is therefore not limited in its scope to the use of the specific means referred to. Thus, for example, in the embodiment of Fig. 1, pulses generated in circuit A might be applied to a device for producing an audible note of a predetermined frequency, and pulses generated in circuit B might be applied to a second device for producing an audible note of a different frequency. The required observations referred to in the discussion of Fig. 1 could then be made simply by listening to these notes, and by observing the times at which notes of both frequencies occur substantially simultaneously. Other variations and modifications in the systems disclosed will occur to those skilled in the art in the light of the foregoing discussion of the principle of the invention with reference to certain of its representative embodiments.

I claim:

1. In a time interval measuring apparatus, a generator of a first series of time-spaced pulse signals periodically recurrent with a predetermined first period, a generator of a second series of time-spaced pulse signals periodically recurrent with a predetermined second period, said second period differing from said first period by an amount which is substantially less than either of said periods, and means for observing the change which occurs in the time-spacing of pulses in one of said series relative to pulses in the other of said series during intervals substantially greater than either of said periods.

2. In a time interval measuring apparatus, a generator of a first series of periodically recurrent time-spaced pulse signals, a generator of a second series of periodically recurrent time-spaced pulse signals, means for causing the period of recurrence of pulses in one of said series to differ from the period of recurrence of pulses in the other of said series by an amount which is substantially less than the period of recurrence of pulses in either of said series, and means for observing the change which occurs in the time-spacing of pulses in one of said series relative to pulses in the other of said series during intervals substantially greater than either of said periods.

3. Apparatus according to claim 2 in which said means for observing the change which occurs in the time-spacing of pulses in one of said series relative to pulses in the other of said series comprises means for indicating visibly the time-spacing between a pulse in one of said series and the next subsequently occurring pulse in the other of said series.

4. Apparatus according to claim 3 in which said means for indicating visibly the time-spacing between a pulse in one of said series and the next subsequently occurring pulse in the other of said series comprises a cathode ray tube synchroscope, means for applying pulses from one of said series to initiate the time base sweep of said synchroscope, and means for applying pulses from the other of said series to produce indications spaced along said time base sweep as a function of their time-spacing with reference to said first-named pulses.

5. In a time interval measuring apparatus, a generator of a first series of periodically recurrent time-spaced pulse signals, a generator of a second series of periodically recurrent time-spaced pulse signals, means for utilizing a delay device of predetermined delay to cause the period of recurrence of pulses in one of said series to differ from the period of recurrence of pulses in the other of said series by an amount substantially equal to said predetermined delay, and means for observing the change which occurs in the time-spacing of pulses in one of said series relative to pulses in the other of said series during intervals of duration substantially greater than the period of recurrence of pulses in either of said series.

6. In a time interval measuring system, a generator of a first series of periodically recurrent time-spaced pulse signals, means including a signal delay device having a predetermined delay for determining the period of recurrence of pulses in said first series in accordance with the delay of said delay device, a generator of a second series of periodically recurrent time-spaced pulse signals, means including said delay device and adapted to cooperate with said delay device and with a second delay device to determine the period of recurrence of pulses in said second series in accordance with the sum of the delays of said devices, and means for observing changes which occur in the time-spacing of pulses in one of said series with reference to pulses in the other of said series during intervals of duration substantially greater than the sum of the delays of said devices.

7. Apparatus according to claim 6 in which said first generator comprises a pulse generator responsive to pulses applied to its input circuit to produce corresponding pulses in its output circuit and a connection from the output to the input of said last-named pulse generator, said connection including said first-named signal delay device, and in which said second-named generator comprises a pulse generator responsive to pulses applied to its input circuit to produce corresponding pulses in its output circuit and a connection from the output to the input of said last-named pulse generator, said last-named connection including both of said delay devices.

8. In a time interval measuring apparatus, a generator of a first series of periodically recurrent time-spaced pulse signals, a generator of a second series of periodically recurrent time-spaced pulse signals, means for causing the period of recurrence of pulses in one of said series to differ from the period of recurrence of pulses in the other of said series by an amount which is substantially less than the period of recurrence of pulses in either of said series, and means for comparing the time-spacing between pulses in one of said series and pulses in the other of said series with a time interval to be measured.

9. In a time interval measuring apparatus, a generator of a first series of periodically recurrent time-spaced pulse signals, a generator of a second series of periodically recurrent time-spaced pulse signals, means for causing the period of recurrence of pulses in one of said series to differ from the period of recurrence of pulses in the other of said series by an amount substantially equal to the duration of the time interval to be measured, and means for observing the change which occurs in the time-spacing of pulses in one of said series relative to pulses in the other of said series during intervals of duration substantially greater than either of said periods.

10. Apparatus for measuring the delay characteristics of electrical circuit elements, said apparatus comprising: a generator of a first series of periodically recurrent time-spaced pulse signals, a generator of a second series of periodically recurrent time-spaced pulse signals, means for utilizing a circuit element whose delay characteristic is to be measured to cause the period of recurrence of pulses in one of said series to differ from the period of recurrence of pulses in the other of said series by an amount equal substantially to the delay inherent in said circuit element, and means for observing the change which occurs in the time-spacing of pulses in one of said series relative to pulses in the other of said series during intervals of duration substantially greater than the period of recurrence of pulses in either of said series.

No references cited.